Patented May 2, 1939

2,156,442

UNITED STATES PATENT OFFICE 2,156,442

SOLUTION FOR DYEING CAST PHENOLIC ARTICLES

Robert O. Wood, Montclair, N. J., assignor to Dipol Process Company, Rochester, N. Y., a partnership composed of Rudolph Siebert, Harry Newman, and Robert O. Wood No Drawing. Application November 20, 1937, Serial No. 175,697

3 Claims. (Cl. 8—4)

This invention relates to a solution for dyeing cast phenolic articles, and has for its object to afford such a composition of materials that is economical to use and can be handled safely.

In methods heretofore proposed for carrying out this purpose, the materials used have been costly as well as inflammable or explosive, and the object of this invention is to afford a comparatively inexpensive solution that can be handled with little difficulty for dyeing cast phenolic articles by a simple process that will affect the surface and penetrate the body of the material sufficiently to create the desired effect.

One example of a practical and successful solution for this purpose is represented by a bath including 1000 cc. water, 75 cc. diethylene glycol, 70 cc. diethylene glycol ethyl ether, 150 gm. common salt, 30 gm. trisodium phosphate, 10 gm. disodium phosphate, and 2 gm. auramine, or other basic dye.

Any spirit soluble basic dye or any combination of such dyes can be used, depending upon the color and intensity desired, and the dye is added to the bath after the remaining ingredients have been mixed and brought to the boiling point.

The diethylene glycol and diethylene glycol ethyl ether function as solvents for the basic dye, acting to keep the dye in solution and to effect the necessary penetration of the surface of the article, and while these are efficient, other glycol or glycol ether solvents derived from ethylene are suitable for this purpose.

The desired alkalinity of the bath is produced by the trisodium and disodium phosphate, and the common salt or other neutral metallic salt brings about a saturated solution readily, and prevents any injury to the surface of the article under treatment.

While permitting the solution to boil slowly, the articles to be dyed are immersed in the solution and agitated for about six or seven minutes.

At the end of this period, the articles are removed and washed in running cold water for about ten minutes, and dried by any of the conventional methods, such as air drying on screens or otherwise, or tumbling in sawdust or other material.

The spent dye solution can be used repeatedly by adding water to make up for evaporation losses, and sufficient dye to replace that which has been used.

While I have disclosed certain definite ingredients in stated proportions, I am not limited in this respect, and this application is intended to cover such other combinations and proportions as may come within the purposes of the invention or the scope of the following claims.

I claim:

1. A solution for dyeing cast phenolic articles including water, a spirit soluble basic dye, a dye solvent consisting of glycol and glycol ether derived from ethylene, and an alkaline agent consisting of tri sodium phosphate and di sodium phosphate.

2. A solution for dyeing cast phenolic articles including water, a spirit soluble basic dye, a dye solvent consisting of glycol and glycol ether derived from ethylene, an alkaline agent consisting of tri sodium phosphate and di sodium phosphate, and common salt.

3. A solution for dyeing cast phenolic articles including 1000 cc. water, 75 cc. diethylene glycol, 70 cc. diethylene glycol ethyl ether, 150 gm. common salt, 30 gm. tri sodium phosphate, 10 gm. di sodium phosphate, and 2 gm. of a basic dye.

ROBERT O. WOOD.